(12) United States Patent
Tani

(10) Patent No.: US 8,791,623 B2
(45) Date of Patent: Jul. 29, 2014

(54) PIEZOELECTRIC ACTUATOR AND PIEZOELECTRIC ACTUATOR ARRAY

(75) Inventor: Makoto Tani, Inazawa (JP)

(73) Assignee: NGK Insulators, Ltd., Nagoya (JP)

( * ) Notice: Subject to any disclaimer, the term of this patent is extended or adjusted under 35 U.S.C. 154(b) by 131 days.

(21) Appl. No.: 13/405,717

(22) Filed: Feb. 27, 2012

(65) Prior Publication Data

US 2012/0217844 A1 Aug. 30, 2012

(30) Foreign Application Priority Data

Feb. 28, 2011 (JP) .................................. 2011-041459

(51) Int. Cl.
*H01L 41/08* (2006.01)

(52) U.S. Cl.
USPC ...................... 310/328; 310/323.02

(58) Field of Classification Search
USPC .............. 310/328, 323, 311, 365–367, 364, 310/323.02, 323.06, 323.09, 323.13
IPC ........................................................ H01L 41/08
See application file for complete search history.

(56) References Cited

U.S. PATENT DOCUMENTS

| | | | | |
|---|---|---|---|---|
| 5,469,302 A * | 11/1995 | Lim | ............................... | 310/328 |
| 5,616,982 A * | 4/1997 | Um et al. | ....................... | 310/328 |
| 6,066,911 A * | 5/2000 | Lindemann et al. | ..... | 310/323.02 |
| 6,246,526 B1 * | 6/2001 | Okuyama | ........................ | 355/53 |
| 6,933,657 B2 * | 8/2005 | Maruyama et al. | ........... | 310/328 |
| 7,884,920 B2 | 2/2011 | Soemers et al. | | |
| 2008/0309901 A1 * | 12/2008 | Soemers et al. | ................ | 310/38 |

FOREIGN PATENT DOCUMENTS

| JP | 2004-140946 A1 | 5/2004 |
|---|---|---|
| JP | 2006-238644 A1 | 9/2006 |
| JP | 2009-004775 A1 | 1/2009 |

* cited by examiner

*Primary Examiner* — Thomas Dougherty
*Assistant Examiner* — Karen B Addison
(74) *Attorney, Agent, or Firm* — Burr & Brown, PLLC

(57) ABSTRACT

An aspect of a piezoelectric actuator according to the present invention comprises: a plate-like piezoelectric element (20); a sheet (30); and a movable body (50). The piezoelectric element is provided to the sheet (30) in such a manner that the upper surface of the plate-like piezoelectric element is parallel to the upper surface of the sheet. The sheet includes a movable body driving section (40) formed on one of the upper and the lower surfaces of the sheet. A movable body includes a contact section (51) contacting with the sheet at the movable body driving section. The actuator moves the movable body driving section in a direction parallel to the upper surface of the sheet by using expansion and contraction of the piezoelectric element in a direction parallel to the upper surface of the piezoelectric element to move the movable body.

9 Claims, 8 Drawing Sheets

PIEZOELECTRIC ACTUATOR AND PIEZOELECTRIC ACTUATOR ARRAY

BACKGROUND OF THE INVENTION

1. Field of the Invention

The present invention relates to: a piezoelectric actuator comprising a plate-like piezoelectric element, a sheet, and a movable body; and a piezoelectric actuator array in which the piezoelectric actuators are arranged in a lattice pattern.

2. Background Art

One of conventional piezoelectric actuators (hereinafter, referred to as a "first conventional device") comprises a cylindrical piezoelectric element. An entire surface of an inner wall of the cylindrical piezoelectric element is covered with an electrode. Electrodes separated one above the other are formed on an outer surface of the cylindrical piezoelectric element. The lower electrode is formed around the lower portion of the cylindrical piezoelectric element. The upper electrode is divided in a circumferential direction.

The first conventional device expands/contracts the cylindrical piezoelectric element in a center axis direction of the cylinder (height direction) using the lower electrode and the inner wall electrode, and simultaneously, flexuously deforms the cylindrical piezoelectric element using the upper electrode and the inner wall electrode. The first conventional device is configured so as to move a movable body (table) with the deformation of the cylindrical piezoelectric element (refer to a first embodiment of Japanese Patent Application Laid-Open No. 2004-140946).

However, according to the first conventional device, a height of the cylindrical piezoelectric element is long, because the electrode formed on the outer wall must be divided into two parts one above the other, and the flexion-deformity need to be large. Consequently, it has a problem that a size of the piezoelectric actuator is large.

Another of the conventional piezoelectric actuators (hereinafter, referred to as a "second conventional device") comprises a plurality of piezoelectric elements. Each of a plurality of the piezoelectric elements is formed by stacking, in the Z-axis direction, a piezoelectric element undergoing a shear deformation in the X-axis direction, a piezoelectric element undergoing a shear deformation in the Y-axis direction, and a piezoelectric element undergoing a shear deformation in the Z-axis direction. The second conventional device is configured so as to move a movable body with the deformation of a plurality of the piezoelectric elements (refer to a second embodiment of Japanese Patent Application Laid-Open No. 2004-140946).

However, according to the second conventional device, a height of the piezoelectric actuator is long, because each of the piezoelectric elements is the element in which the "three of the piezoelectric elements are stacked". Consequently, it has a problem that a size of the piezoelectric actuator is large.

Still another of the conventional piezoelectric actuators (hereinafter, referred to as a "third conventional device") comprises a layered (stacked) piezoelectric element having a quadratic prism shape. The third conventional device is configured so as to rotate a movable body (round body) by having the layered piezoelectric element undergo appropriate flexion deformation and shear deformation (refer to a second embodiment of Japanese Patent Application Laid-Open No. 2006-238644).

However, according to the third conventional device, it is necessary to enlarge the flexion deformation and the shear deformation in order to move the movable body rapidly, and thus, it is necessary to enlarge a height of the piezoelectric element. Consequently, it has a problem that a size of the piezoelectric actuator is large.

Yet still another of the conventional piezoelectric actuators (hereinafter, referred to as a "fourth conventional device") is a device in which a piezoelectric element undergoing a shear deformation in the X-axis direction and a piezoelectric element undergoing a shear deformation in the Y-axis direction are stacked, and is configured so as to move a movable body (swivel mirror) using the deformations of those piezoelectric elements (refer to a second embodiment of Japanese Patent Application Laid-Open No. 2009-4775).

However, according to the fourth conventional device, since a single element is "one in which the piezoelectric element undergoing a shear deformation in the X-axis direction and the piezoelectric element undergoing a shear deformation in the Y-axis direction are stacked", a height of the cylindrical piezoelectric element may be long. Consequently, it has a problem that a size of the piezoelectric actuator is large.

SUMMARY OF THE INVENTION

One of objects of the present invention is to provide a piezoelectric actuator whose length in height is small, and which is therefore downsized.

The piezoelectric actuator of the present invention (hereinafter, also referred to as a "present piezoelectric actuator") comprises a plate-like piezoelectric element having an upper surface and a lower surface parallel to the upper surface, a sheet having an upper surface and a lower surface parallel to the upper surface of the sheet, and a movable body.

The plate-like piezoelectric element may be an element which is separable from the sheet, and may be fixed onto one of the upper surface and the lower surface of the sheet. Alternatively, when the sheet is a piezoelectric sheet (sheet formed of a piezoelectric body), the plate-like piezoelectric element may consist of a pair of electrodes that are formed at a predetermined position (in an area where the plate-like piezoelectric element is supposed to be formed) of the piezoelectric sheet in such a manner that a pair of the electrodes sandwich the piezoelectric sheet, and a portion which is sandwiched by a pair of the electrodes.

In any of the both cases, the plate-like piezoelectric element is provided to the sheet in such a manner that the upper surface of the plate-like piezoelectric element is parallel to the upper surface of the sheet.

Further, the sheet includes a movable body driving section on one of the upper surface and the lower surface of the sheet, and the movable body includes a contact section which contacts with the sheet at the movable body driving section. In addition, the present piezoelectric actuator is configured so as to move the movable body driving section in a direction parallel to the upper surface of the sheet by using expansion-contraction deformation parallel to a direction of the upper surface of the plate-like piezoelectric element, and so as to move the movable body through a frictional force generated between the movable body driving section and the contact section.

According to this configuration, by having the plate-like piezoelectric element expand and contract in the direction parallel to the upper surface of the plate-like piezoelectric element, the movable body driving section is moved in the direction parallel to the upper surface of the sheet. Thus, the "contact section of the movable body" contacting with the movable body driving section is moved. Accordingly, without enlarging a height (thickness) of the piezoelectric element, it is possible to move the movable body driving section by an appropriate distance. Consequently, the piezoelectric actuator, which has a small height, and which is therefore downsized, can be provided.

One of aspects of the present piezoelectric actuator comprises a "spring element applying a force toward the movable body driving section" onto a portion of the other surface of the sheet on which the movable body driving section is not formed, where the portion is facing/opposed to the movable body driving section. According to this aspect, the movable body driving section of the sheet is pushed/pressed toward the contact section of the movable body, and thus, a frictional force (static frictional force etc.) of appropriately controlled magnitude can be generated between the movable body driving section of the sheet and the contact section of the movable body. Accordingly, the movable body can be more certainly moved.

Further, it is preferable that the plate-like piezoelectric element have a belt-like shape (e.g., rectangular shape, ellipsoidal shape, oval shape, and the like) having a longitudinal direction and a width direction (short direction) orthogonal to the longitudinal direction, when (it is) viewed along a direction perpendicular to the upper surface of the plate-like piezoelectric element.

Further, when the present piezoelectric actuator includes at least two of the plate-like piezoelectric elements, the at least two of the plate-like piezoelectric elements may be arranged/disposed when viewed along a direction perpendicular to the upper surface of the sheet in such a manner that:

center lines, each parallel to each of the longitudinal directions of the two of the plate-like piezoelectric elements, are on the same/single straight line; and the two of the plate-like piezoelectric elements are opposed to each other to sandwich the movable body driving section therebetween.

According to the configuration above, an appropriate magnitude of force can be applied to the movable body driving section to thereby appropriately displace (or move) the movable body driving section, by deforming one of the plate-like piezoelectric elements in such a manner that the one of the plate-like piezoelectric elements expands (or extends) in the longitudinal direction, and by simultaneously deforming the other of the plate-like piezoelectric elements in such a manner the other of the plate-like piezoelectric elements contracts (or shrinks) in the longitudinal direction.

Furthermore, the at least two of the plate-like piezoelectric elements may be arranged/disposed when viewed along a direction perpendicular to the upper surface of the sheet in such a manner that center lines, each parallel to each of the longitudinal directions of the two of the plate-like piezoelectric elements, intersect one another at the movable body driving section. According to the configuration above, the movable body driving section can be moved two-dimensionally (i.e., in the X-axis direction, and in the Y-axis direction orthogonal to the X-axis direction).

In this case, further the at least two of the plate-like piezoelectric elements may be arranged/disposed so as to be rotationally symmetric with respect to a contact point between the movable body driving section and the contact section when viewed along a direction perpendicular to the upper surface of the sheet. For examples, three of the plate-like piezoelectric elements may be arranged/disposed at the corners of a regular triangle, four of the plate-like piezoelectric elements may be arranged/disposed at the corners of a regular tetragon, and six of the plate-like piezoelectric elements may be arranged/disposed at the corners of a regular hexagon. In addition, when the present piezoelectric actuator includes four of the plate-like piezoelectric elements, they may be arranged/disposed cruciately (or to form a cross-line figure) when viewed along a direction perpendicular to the upper surface of the sheet.

It should be noted that the present piezoelectric actuators may be used as a piezoelectric actuator array in which the piezoelectric actuators are arranged (disposed) so as to lie adjacent to each other with a substantially constant interval in a longitudinal direction and in a transverse direction.

Other and further objects, features, and advantages of the present invention will be apparent from following description on each of embodiments of the present invention, taken in consideration with the accompanying drawings in which.

DESCRIPTION OF EMBODIMENTS

Next will be described a piezoelectric actuator according to each of embodiments of the present invention with reference to the drawings.

The piezoelectric actuator according to each of the embodiments can be applied to, but not limited to, lithography equipments, positioning stages, camera lens moving apparatuses, and so on.

First Embodiment

Figure 2:
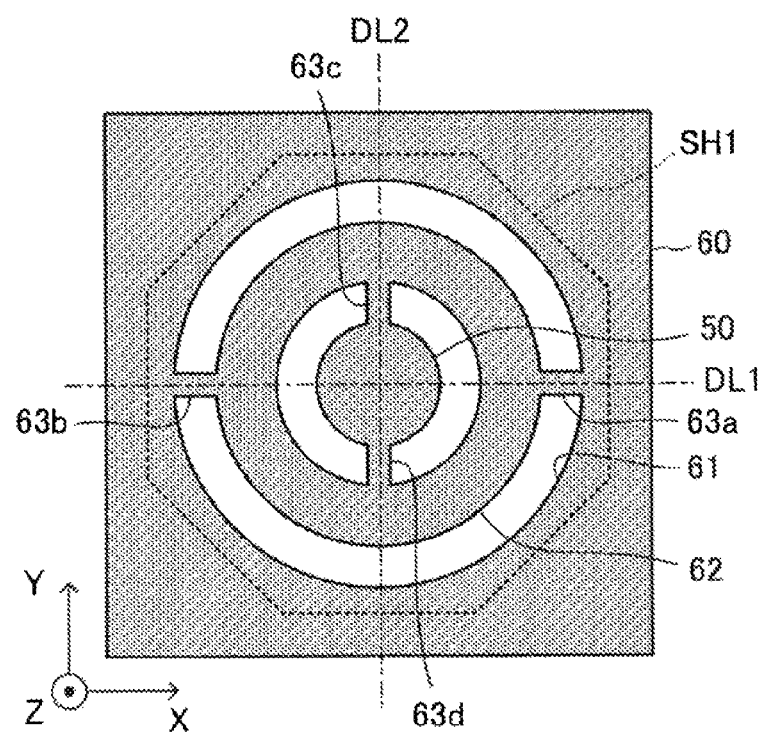
FIG. 2 is a plan view of the movable body holding member and the movable body, shown in FIG. 1.
Figure 3:
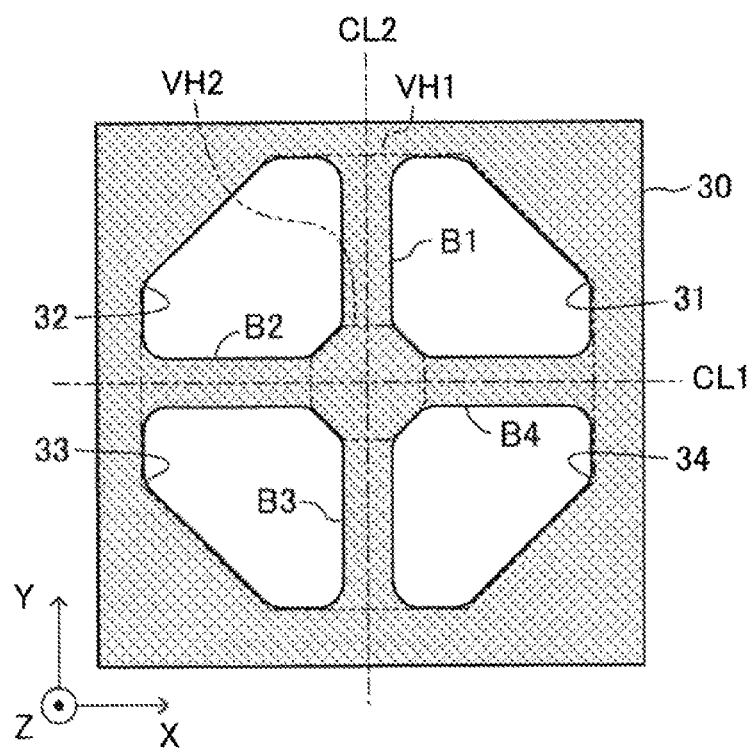
FIG. 3 is a plan view of the sheet shown in FIG. 1.
Figure 4:
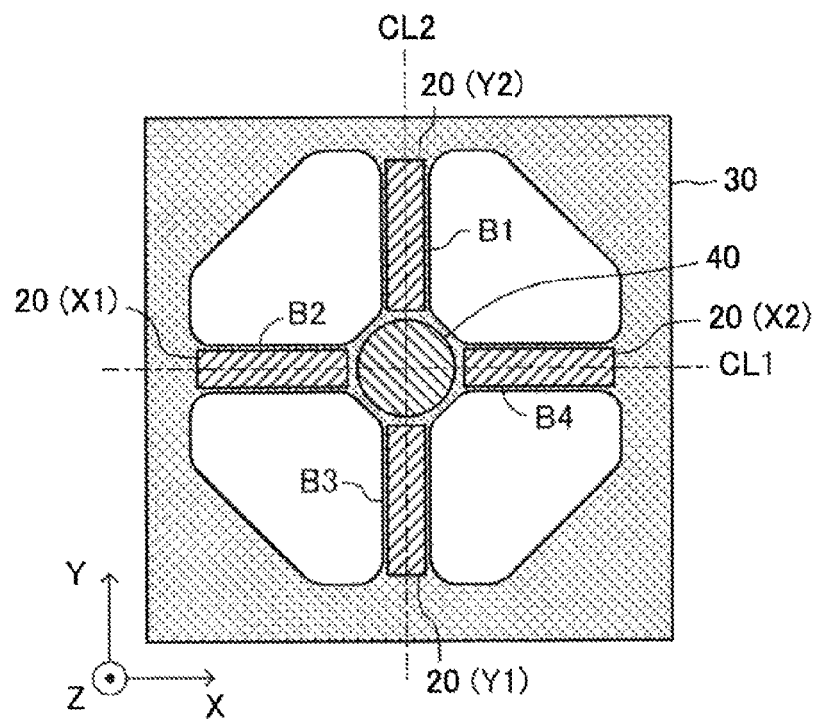
FIG. 4 is a plan view of the sheet, the plate-like piezoelectric elements, and the friction member, shown in FIG. 1.

As shown in FIGS. 1-7, a piezoelectric actuator 10 according to a first embodiment of the present invention includes four of plate-like piezoelectric elements 20 (refer to FIG. 4). Further, the piezoelectric actuator 10 comprises a sheet 30, a friction member 40, a movable body 50, a movable body holding member 60 serving as a first supporting section, a second supporting section 70, a mirror 80, a spring element 90, and a base section 100.

Figure 13:
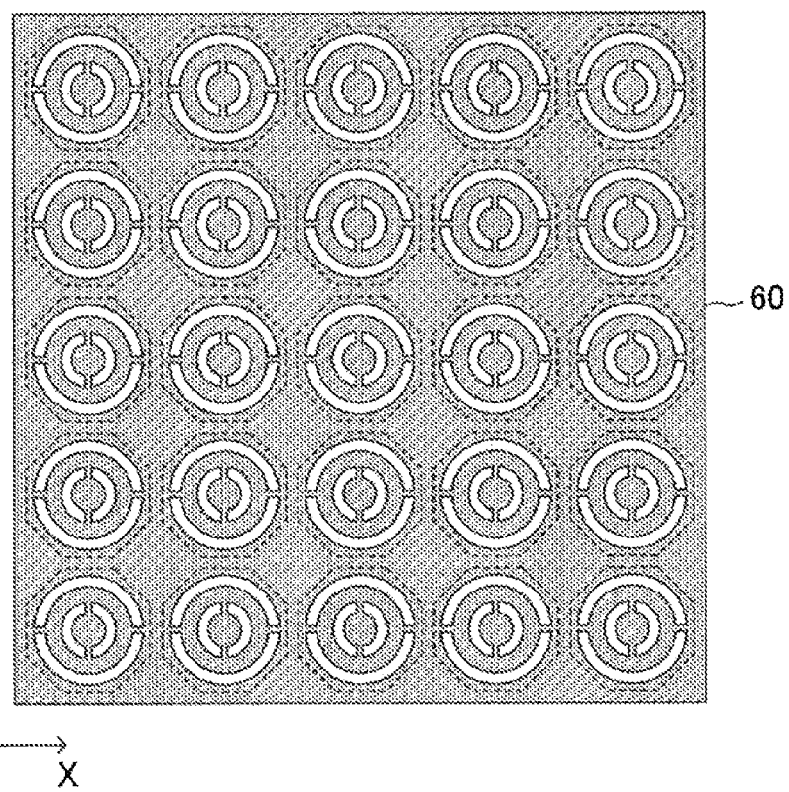
FIG. 13 is a plan view of a movable body holding member, and a movable body, which are used to array the piezoelectric actuators shown in FIG. 1.
Figure 14:
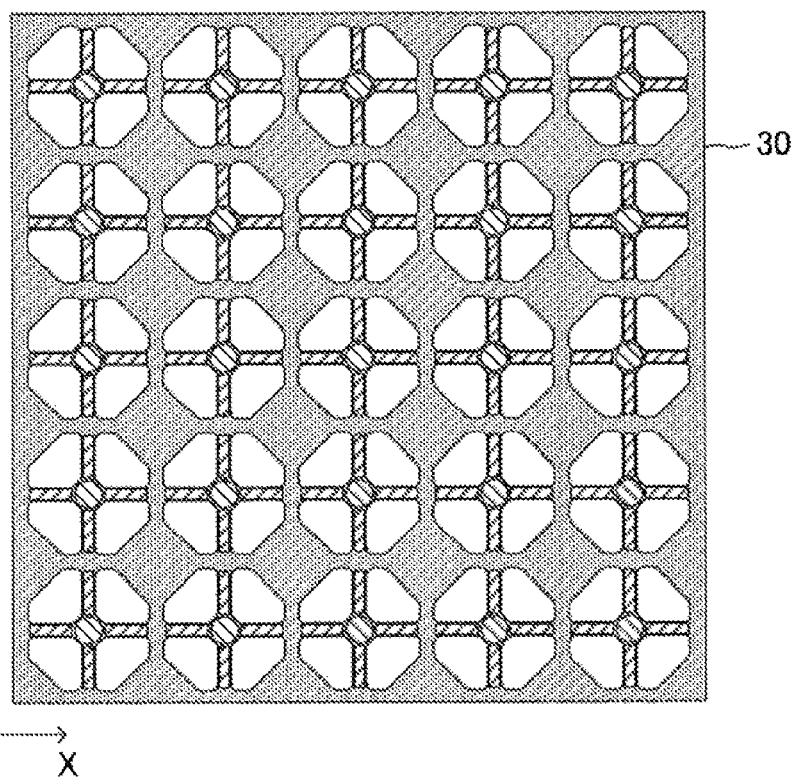
FIG. 14 is a plan view of a sheet, a plate-like piezoelectric elements, and friction members, which are used to array the piezoelectric actuators shown in FIG. 1.

As understood from FIGS. 13 and 14, the piezoelectric actuators 10 can be manufactured as an actuator array in which a plurality of the piezoelectric actuators 10 are arranged (disposed) so as to lie adjacent to each other with a substantially constant interval in a longitudinal direction and in a transverse direction (i.e., a plurality of the piezoelectric actuators 10 are arranged so as to be in a matrix or lattice pattern). Hereinafter, a single piezoelectric actuator 10 is described.

Each of the four plate-like piezoelectric elements 20 is a plate. That is, the plate-like piezoelectric element 20 has a plate shape. Therefore, each of the upper surface and the lower surface of the plate-like piezoelectric element 20 is a plane surface (flat surface), and those surfaces are parallel to each other. Further, in a case in which the plate-like piezoelectric element 20 is fixed to the piezoelectric actuator 10, the upper surface and the lower surface of the plate-like piezoelectric element 20 is parallel to an X-Y plane. Each of the upper surface and the lower surface of the plate-like piezoelectric element 20 is also referred to as a principal surface of the plate-like piezoelectric element 20.

As shown in FIG. 4, the plate-like piezoelectric element 20, when viewed along a direction perpendicular to the upper surface of the plate-like piezoelectric element 20 (hereinafter, the direction being referred to as an "element principal surface perpendicular direction"), has a rectangular shape having a long side and a short side. That is, a planar shape of the plate-like piezoelectric element 20 (shape of the plate-like piezoelectric element 20 when viewed along the element principal surface perpendicular direction) is a belt-like shape having a longitudinal direction (the long side) and a width direction (short direction, the short side) orthogonal to the longitudinal direction.

Figure 5:
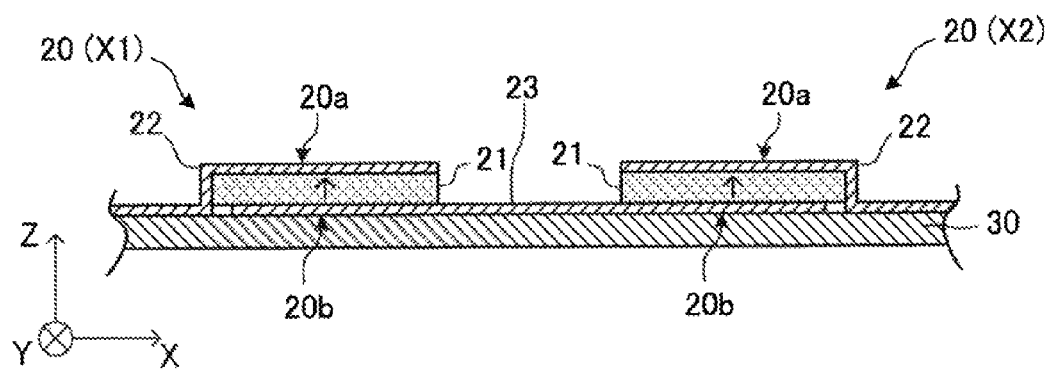
FIG. 5 is a schematic sectional view of the sheet, and the plate-like piezoelectric elements, shown in FIG. 1.

As schematically shown in FIG. 5, the plate-like piezoelectric element 20 comprises a piezoelectric layer (e.g., a layer made of a piezoelectric material such as lead zirconate titanate (PZT)) 21, an upper electrode (upper electrode layer) 22, and a lower electrode (lower electrode layer) 23. The upper electrode 22 is formed on an upper portion of the piezoelectric layer 21. The lower electrode 23 is formed on a lower portion of the piezoelectric layer 21. That is, the upper electrode 22 and the lower electrode 23 are formed so as to be opposed (face) to each other so that the piezoelectric layer 21 is sandwiched between these electrodes. Consequently, an upper surface of the upper electrode 22 is/constitutes an upper surface 20a of the plate-like piezoelectric element 20, and a lower surface of the lower electrode 23 is/constitutes a lower surface 20b of the plate-like piezoelectric element 20. Polarization treatment was performed in the piezoelectric layer 21 in its thickness direction. The direction of the polarization is in a direction perpendicular to the principal surface of the element, and in a direction (i.e., positive direction of the Z-axis) from the lower electrode 23 to the upper electrode 22 (refer to an arrow in the piezoelectric layer 21 shown in FIG. 5). It should be noted that the friction member 40 is omitted in FIG. 5.

The sheet (connecting sheet) 30 is one of:
thin (plate) sheet made of a metal material such as copper, stainless, nickel, and kovar, or a ceramic material such as alumina, zirconia, and PZT;
a single-crystal wafer (sheet) made of silicon, or the like;
a film (sheet) made of a resin material such as polyester, and polyimide; and
a composite sheet made by laminating and unifying a plurality of sheets made of materials different from each other among those materials.

Accordingly, each of the upper surface and the lower surface of the sheet 30 is also a plane surface (flat surface), and they are parallel to each other.

In a state in which the sheet 30 is mounted in (fixed to) the piezoelectric actuator 10, each of the upper surface and the lower surface of the sheet 30 is parallel to the X-Y plane. Each of the upper surface and the lower surface of the sheet 30 is also referred to as a principal surface of the sheet 30. As shown in FIG. 3, a shape of the sheet 30 (planar shape of the sheet 30) when viewed along a direction perpendicular to the upper surface of the sheet 30 (hereinafter, the direction being referred to as a "sheet principal surface perpendicular direction") is a square having a side parallel to the X-axis and a side parallel to the Y-axis. Accordingly, the sheet 30, when viewed in plan, has a center line CL1 (first center line CL1) which lies middest of the Y-axis length (lies in the midst of the side parallel to the Y-axis) and parallel to the X-axis, and a center line CL2 (second center line CL2) which lies middest of the X-axis length (lies in the midst of the side parallel to the X-axis) and parallel to the Y-axis. A point of intersection between the first center line CL1 and the second center line CL2 is referred to as a "center of the sheet 30".

Four holes (through holes) 31-34 are formed in the sheet 30. An outside region (portion) of a first virtual regular octagon VH1 of the sheet 30 remains (ie left) by (owing to) those holes 31-34, the virtual regular octagon VH1 being formed in the sheet 30, the center of the virtual regular octagon VH1 coinciding with the center of the sheet 30, two sides of the virtual regular octagon VH1 being parallel to the X-axis, and another two sides of the virtual regular octagon VH1 being parallel to the Y-axis, when viewed in plan. Further, an inside region (portion) of a second virtual regular octagon VH2 smaller than the first virtual regular octagon VH1 of the sheet 30 remains (is left) by (owing to) those holes 31-34, the virtual regular octagon VH2 being formed in the sheet 30, the center of the virtual regular octagon VH2 coinciding with the center of the sheet 30, two sides of the virtual regular octagon VH2 being parallel to the X-axis, another two sides of the virtual regular octagon VH2 being parallel to the Y-axis, when viewed in plan. In addition, "four of belt-like portions B1-B4 of the sheet 30" remain (are left) by (owing to) those holes 31-34, the belt-like portions B1-B4 connecting between the outside region of the first virtual regular octagon VH1 and the inside region of the second virtual regular octagon VH2. A width of each of the belt-like portions B1-B4 is slightly larger than the width of the plate-like piezoelectric element 20.

The belt-like portion B1 is disposed in a region in a positive direction of the Y-axis with respect to the first center line CL1. A center line of the belt-like portion B1 parallel to a longitudinal direction of the belt-like portion B1 coincides with (is on) the second center line CL2.

The belt-like portion B2 is disposed in a region in a negative direction of the X-axis with respect to the second center line CL2. A center line of the belt-like portion B2 parallel to a longitudinal direction of the belt-like portion B2 coincides with (is on) the first center line CL1.

The belt-like portion B3 is disposed in a region in a negative direction of the Y-axis with respect to the first center line CL1. A center line of the belt-like portion B3 parallel to a longitudinal direction of the belt-like portion B3 coincides with (is on) the second center line CL2.

The belt-like portion B4 is disposed in a region in a positive direction of the X-axis with respect to the second center line CL2. A center line of the belt-like portion B4 parallel to a longitudinal direction of the belt-like portion B4 coincides with (is on) the first center line CL1.

As shown in FIG. 4, each of the four plate-like piezoelectric elements 20 is disposed on (fixed to) the upper surface of the sheet 30 and at each of the four belt-like portions B1-B4. Accordingly, the upper surface and the lower surface of the plate-like piezoelectric element 20 are parallel to each of the upper surface and the lower surface of the sheet 30. That is, each of the plate-like piezoelectric elements 20 is formed on the principal surface (upper surface) of the sheet 30 in such a manner that each of the principal (upper) surfaces of the plate-like piezoelectric elements 20 is parallel to the principal (upper) surface of the sheet 30.

The plate-like piezoelectric element 20 formed on the belt-like portion B2 is referred to as a first X-axis piezoelectric element 20(X1), for convenience.

The plate-like piezoelectric element 20 formed on the belt-like portion B4 is referred to as a second X-axis piezoelectric element 20(X2), for convenience.

The plate-like piezoelectric element 20 formed on the belt-like portion B3 is referred to as a first Y-axis piezoelectric element 20(Y1), for convenience.

The plate-like piezoelectric element 20 formed on the belt-like portion B1 is referred to as a second Y-axis piezoelectric element 20(Y2), for convenience.

The friction member 40 is made of, for example, one of:

a ceramic material having a high wear and abrasion resistance such as alumina, and zirconia;

a plastic material having an excellent slidability, such as polyacetal, polyamide, polyimide, and polytetrafluoroethylene;

a composite resin material including carbon fibers, inorganic whiskers, and the like; and a metal material such as stainless, nickel, and copper.

Figure 1:
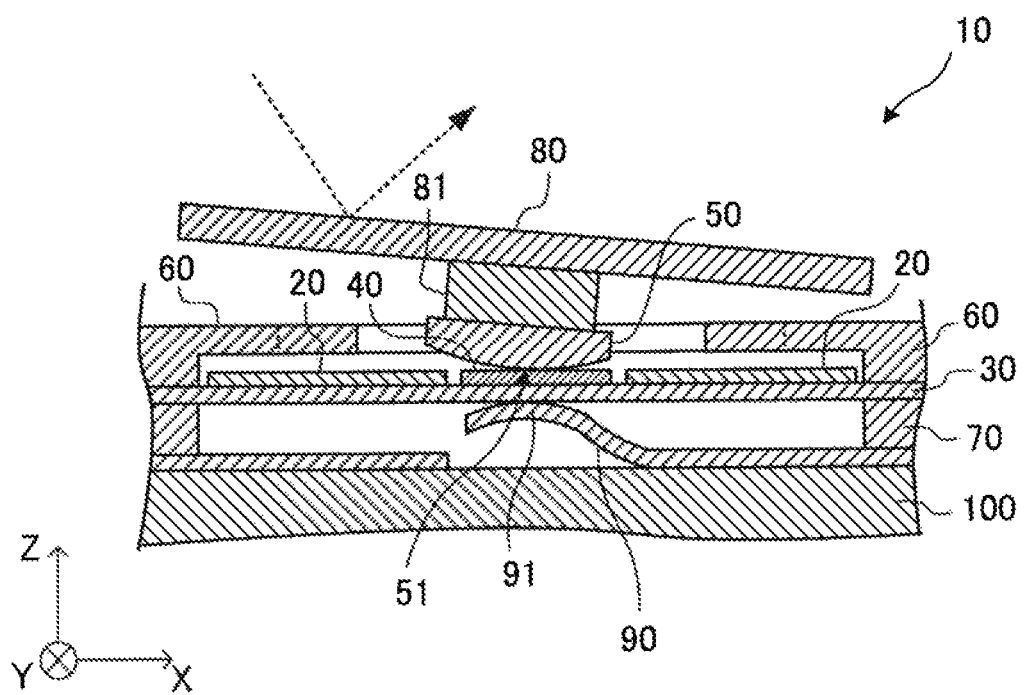
FIG. 1 is a schematic sectional view of a piezoelectric actuator according to a first embodiment of the present invention.

As shown in FIGS. 1 and 4, the friction member 40 is plate-like. That is, each of an upper surface and a lower surface of the friction member 40 is a plane surface (flat surface), and those surfaces are parallel to each other. In a state in which the friction member 40 is fixed to the piezoelectric actuator 10, as shown in FIG. 4, the friction member 40 is, when viewed along a direction perpendicular to the upper surface of the friction member 40 (i.e., Z-axis direction, and hereinafter, the direction being also referred to as a "friction member principal surface perpendicular direction"), a flat plate smaller than the "above-described second virtual regular octagon VH2". A planar shape of the friction member 40 (shape of the friction member 40 when viewed along the friction member principal surface perpendicular direction) may be, but not limited to, a circular shape, or a polygonal shape such as a tetragon, a hexagon, and an octagon. The friction member 40 is disposed/fixed on the upper surface of the sheet 30 and inside region of the second virtual regular octagon VH2 in such a manner that a center of the friction member 40 coincides with the center of the sheet 30. As described later, the friction member 40 contacts with the movable body 50 (the contact section 51) and moves the movable body 50. Accordingly, the portion of the sheet 30, at which the friction member 40 is disposed, is also referred to as a movable body driving section.

The friction member 40 is a member which is for providing a frictional force having an appropriate magnitude between the movable body 50 and the contact section 51 to thereby move the movable body 50. Thus, if an appropriate frictional force can be generated between the sheet 30 and the contact section 51 even when the friction member 40 is not provided on the sheet 30, the friction member 40 is not necessary. Even when the friction member 40 is not disposed, a region corresponding to the region where the friction member 40 is disposed when it is necessary is referred to as the movable body driving section.

The first X-axis piezoelectric element 20(X1) is disposed in a region in a negative direction of the X-axis with respect to the second center line CL2, in such a manner that its center line (center line of a width direction) parallel to its longitudinal direction coincides with (or is on) the first center line CL1.

The second X-axis piezoelectric element 20(X2) is disposed in a region in a positive direction of the X-axis with respect to the second center line CL2, in such a manner that its center line (center line of a width direction) parallel to its longitudinal direction coincides with (or is on) the first center line CL1.

Accordingly, two of (a pair of) the plate-like piezoelectric elements 20 (X1, X2) are arranged/disposed on the upper surface of the sheet 30 in such a manner that the center lines, each being parallel to each of the longitudinal directions of the two plate-like piezoelectric elements, are on a single straight line (first center line CL1), and they are opposed to each other to sandwich the friction member 40 serving as the movable body driving section therebetween.

The first Y-axis piezoelectric element 20(Y1) is disposed in a region in a negative direction of the Y-axis with respect to the first center line CL1, in such a manner that its center line (center line of a width direction) parallel to its longitudinal direction coincides with (or is on) the second center line CL2.

The second Y-axis piezoelectric element 20(Y2) is disposed in a region in a positive direction of the Y-axis with respect to the first center line CL1, in such a manner that its center line (center line of a width direction) parallel to its longitudinal direction coincides with (or is on) the second center line CL2.

Accordingly, two of (a pair of) the plate-like piezoelectric elements 20 (Y1, Y2) are arranged/disposed on the upper surface of the sheet 30 in such a manner that the center lines, each being parallel to each of the longitudinal directions of the two plate-like piezoelectric elements, are on a single straight line (second center line CL2), and they are opposed to each other to sandwich the friction member 40 serving as the movable body driving section therebetween.

Further, the four plate-like piezoelectric elements 20 can be said to be arranged in a cross shape (or to form a cross-line figure).

As shown in FIGS. 1 and 2, the movable body 50 has a shape whose upper surface is flat, and whose lower surface is spherical (a part of a spherical shape). The movable body 50 has a circular shape when viewed along a direction perpendicular to the upper surface of the movable body 50 (i.e., when viewed in plan). The movable body 50 is made of: a metal material such as copper, stainless, nickel, and kovar; a ceramic material such as alumina, and zirconia; glass; silicon; or the like. The movable body 50 may be unified with the movable body holding member 60 described later. A lower surface of the movable body 50 constitutes a contact section 51. The contact section 51 contacts with an upper surface of the friction member 40.

The movable body holding member 60 is a plate made of: a metal material such as copper, stainless, nickel, and kovar; a ceramic material such as alumina, and zirconia; glass; silicon; or the like. An upper surface of the movable body holding member 60 is a plane surface (flat surface). In a state in which the movable body holding member 60 is fixed to the piezoelectric actuator 10, the upper surface of the movable body holding member 60 is parallel to the X-Y plane. As shown in FIG. 2, a shape of the movable body holding member 60 (planar shape of the movable body holding member 60) when viewed along a direction perpendicular to the upper surface of the movable body holding member 60 (Z-axis direction, hereinafter, the direction being referred to as a "holding section principal surface perpendicular direction") is a square having a side parallel to the X-axis and a side parallel to the Y-axis.

Accordingly, the movable body holding member 60, when viewed in plan, has a center line DL1 (first center line DL1) which lies middest of the Y-axis length (lies in the midst of the side parallel to the Y-axis) and parallel to the X-axis, and a center line DL2 (second center line DL2) which lies middest of the X-axis length (lies in the midst of the side parallel to the X-axis) and parallel to the Y-axis. A point of intersection between the first center line DL1 and the second center line DL2 is referred to as a "center of the movable body holding member 60".

A thickness of the movable body holding member 60 is relatively large in a region outside of a regular octagon SH1 shown by a broken line in FIG. 2, and is relatively small in a region inside of the regular octagon SH1. The regular octagon SH1 has the same shape as the first virtual regular octagon VH1. That is, the movable body holding member 60 has a thick portion at its outer portion. The thick portion is also referred to as a first supporting section. In this way, the first supporting section can be configured integrally with the movable body holding member 60. It should be noted that the first supporting section may be formed separately from the movable body holding member 60, and the first supporting section may be adhered or joined to the movable body holding member 60. A lower surface of the first supporting section is a plane surface (flat surface), and is parallel to the X-Y plane when the movable body holding member 60 is fixed to the piezoelectric actuator 10.

The movable body holding member 60 has a gimbal structure. More specifically, the movable body holding member 60 has a circular hole 61 inside of the octagon SH1 when viewed in plan. The center of the circular hole 61 coincides with the center of the movable body holding member 60. Further, the movable body holding member 60 has a ring portion (annulus portion having a constant width) 62. A center of the ring portion 62 coincides with the center of the movable body holding member 60. An outer diameter of the ring portion 62 is smaller than a diameter of the circular hole 61. An inner diameter of the ring portion 62 is larger than a diameter of the movable body 50.

The movable body holding member 60 includes a first hinge portion (beam portion) 63a, a second hinge portion (beam portion) 63b, a third hinge portion (beam portion) 63c, and a fourth hinge portion (beam portion) 63d.

The first hinge portion 63a has a belt-like shape having a longitudinal direction along the X-axis direction. The first hinge portion 63a connects between the "ring portion 62" and an "outer (outside) portion of the circular hole 61 of the movable body holding member 60" at a position in the positive direction with respect to the second center line DL2. A center line parallel to the longitudinal direction of the first hinge portion 63a coincides with (is on) the first center line DL1 of the movable body holding member 60.

The second hinge portion 63b has a belt-like shape having a longitudinal direction along the X-axis direction. The second hinge portion 63b connects between the "ring portion 62" and the "outer (outside) portion of the circular hole 61 of the movable body holding member 60" at a position in the negative direction with respect to the second center line DL2. A center line parallel to the longitudinal direction of the second hinge portion 63b coincides with (is on) the first center line DL1 of the movable body holding member 60.

The third hinge portion 63c has a belt-like shape having a longitudinal direction along the Y-axis direction. The third hinge portion 63c connects between the "movable body 50" and the "ring portion 62" at a position in the positive direction with respect to the first center line DL1. A center line parallel to the longitudinal direction of the third hinge portion 63c coincides with (is on) the second center line DL2 of the movable body holding member 60.

The fourth hinge portion 63d has a belt-like shape having a longitudinal direction along the Y-axis direction. The fourth hinge portion 63d connects between the "movable body 50" and the "ring portion 62" at a position in the negative direction with respect to the first center line DL1. A center line parallel to the longitudinal direction of the fourth hinge portion 63d coincides with (is on) the second center line DL2 of the movable body holding member 60.

Figure 6:
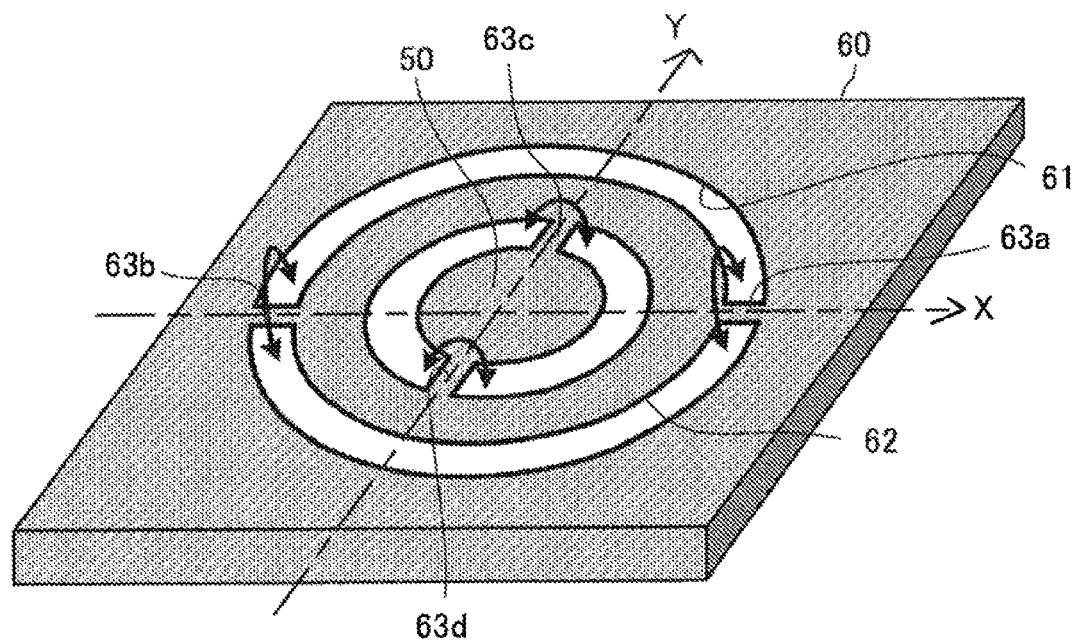
FIG. 6 is a schematic perspective view of the movable body holding member, and the movable body, shown in FIG. 1.

Consequently, the movable body 50 is supported by the movable body holding member 60 in such a manner that the movable body 50 can substantially rotate around two axes. That is, as shown in FIG. 6, when the movable body 50 receives a force which causes the movable body 50 to rotate around the X-axis, the first hinge portion 63a and the second hinge portion 63b are twisted around the X-axis. Accordingly, the movable body 50 can rotate around the X-axis. Similarly, when the movable body 50 receives a force which causes the movable body 50 to rotate around the Y-axis, the third hinge portion 63c and the fourth hinge portion 63d are twisted around the Y-axis. Accordingly, the movable body 50 can rotate around the Y-axis.

Figure 7:
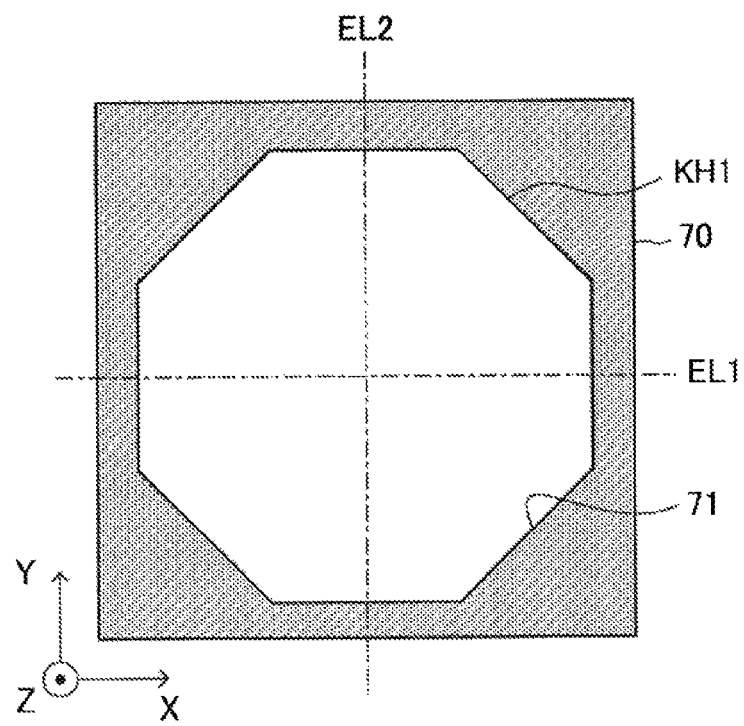
FIG. 7 is a plan view of the second supporting member shown in FIG. 1.

As shown in FIG. 7, the second supporting section 70 is a plate made of: a metal material such as copper, stainless, nickel, and kovar; a ceramic material such as alumina, zirconia and PZT; glass; silicon; a resin material such as polyester, polyimide, and an epoxide resin. Therefore, each of an upper surface and a lower surface of the second supporting section 70 is a plane surface (flat surface), and those surfaces are parallel to each other. Further, in a state in which the second supporting section 70 is fixed to the piezoelectric actuator 10, each of the upper surface and the lower surface of the second supporting section 70 is parallel to the X-Y plane. Each of the upper surface and the lower surface of the second supporting section 70 is also referred to as principal surfaces of the second supporting section 70. As shown in FIG. 7, a shape of the second supporting section 70 (planar shape of the second supporting section 70) when viewed along a direction perpendicular to the upper surface of the second supporting section 70 (Z-axis direction, hereinafter, the direction being referred to as a "second supporting section principal surface perpendicular direction") is a square having a side parallel to the X-axis and a side parallel to the Y-axis. Accordingly, the second supporting section 70, when viewed in plan, has a center line EL1 (first center line EL1) which lies middest of the Y-axis length (lies in the midst of the side parallel to the Y-axis) and parallel to the X-axis, and a center line EL2 (second center line EL2) which lies middest of the X-axis length (lies in the midst of the side parallel to the X-axis) and parallel to the Y-axis. A point of intersection between the first center line EL1 and the second center line EL2 is referred to as a center of the second supporting section 70. A through hole 71 is formed/provided in the second supporting section 70. A shape of the through hole 71 when viewed in plan is a regular octagon KH1 which is the same as the "regular octagon SH1 and the first virtual regular octagon VH1".

As shown in FIG. 1, the sheet 30 is supported by being sandwiched between the thick portion (first supporting portion) of the movable body holding member 60 and the second supporting section 70. More specifically, the sheet 30 is sandwiched between the first supporting portion and the second supporting section 70 in such a manner that the regular octagon SH1, the first virtual regular octagon VH1, and the regular octagon KH1 coincide with each other when the piezoelectric actuator 10 is viewed in the Z-axis direction. When the sheet 30 is sandwiched between the first supporting portion and the second supporting section 70, the movable body 50 (contact portion 51) is pushed onto the upper surface of the friction member 40.

As shown in FIG. 1, the spring element (pushing means) 90 is sandwiched between the base section 100 and the second supporting section 70. The spring element 90 is an "elastic plate" made of a material such as stainless, phosphor bronze, and beryllium copper alloy, and has a curved portion 91. The curved portion 91 contacts with a portion of the sheet 30 at a position/portion (region including the center of the sheet 30) opposed to the friction member 40 across the sheet 30. The thus configured spring element 90 applies a force toward the Z-axis positive direction to the neighborhood of the center of the sheet 30.

A supporting column 81 is fixed onto the upper portion of the movable body 50. A mirror 80 is fixed onto the upper portion of the supporting column 81. Accordingly, an angle of the mirror 80 is varied when the movable body 50 is rotated. The supporting column 81 is made of a material, such as silicon, stainless, nickel, copper, or the like.

Figure 8:
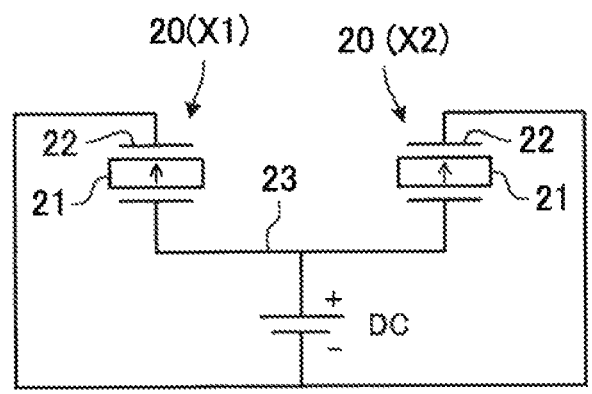
FIG. 8 is a circuit diagram for a polarization treatment on the plate-like piezoelectric elements shown in FIG. 1.

FIG. 8 shows an example of a circuit diagram used when performing a polarization treatment on the first X-axis piezoelectric element 20(X1) and the second X-axis piezoelectric element 20(X2), in the thus configured piezoelectric actuator 10. In the present example, as shown in FIG. 5, the lower electrode 23 is common to (shared by) the first X-axis piezoelectric element 20(X1) and the second X-axis piezoelectric element 20(X2), and therefore, the lower electrode 23 is connected with a positive electrode of a DC power supply DC. Further, each of the upper electrodes 22 of the first X-axis piezoelectric element 20(X1) and the second X-axis piezoelectric element 20(X2) is connected with a negative electrode of the DC power supply DC. Accordingly, an electrical field from the lower electrode 23 to the upper electrode 22 is applied to each of the piezoelectric layers 21, and thus, the polarization treatment is carried out. Polarization treatment on the first Y-axis piezoelectric element 20(Y1) and the second Y-axis piezoelectric element 20(Y2) is similarly performed.

Figure 9:
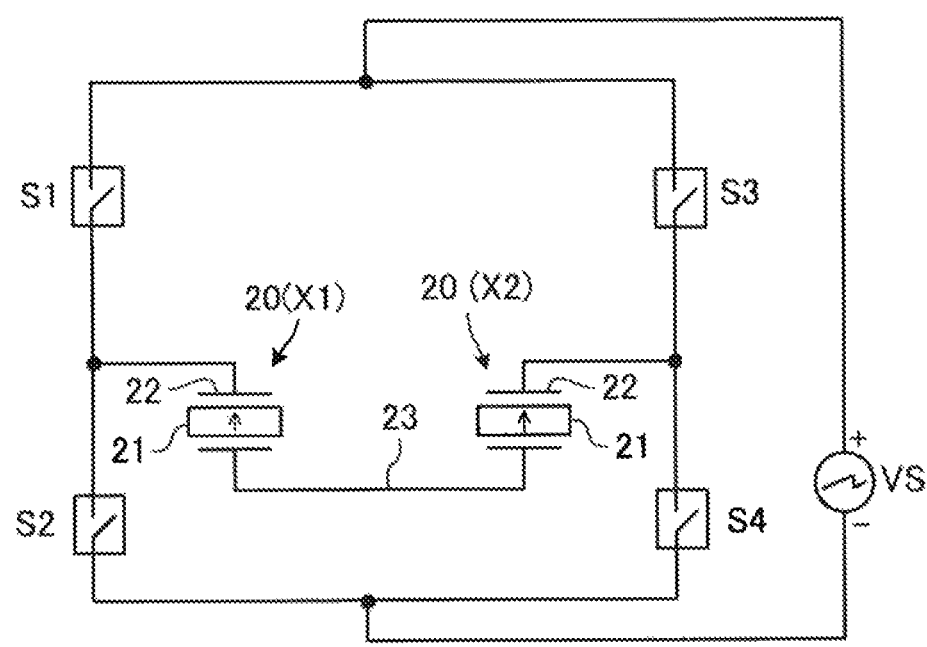
FIG. 9 is a circuit diagram for driving the piezoelectric actuator shown in FIG. 1.

FIG. 9 shows a circuit diagram of a driving circuit for the piezoelectric actuator 10. This driving circuit includes switching elements S1-S4, and a power supply for driving VS. In the driving circuit, when the switching element S1 and the switching element S4 are simultaneously closed, the switching element S2 and the switching element S3 are simultaneously opened. At this moment, if a positive electric potential is generated at the positive electrode (+) of the power supply VS, an electric potential of the upper electrode 22 is higher than an electric potential of the lower electrode 23 in the first X-axis piezoelectric element 20(X1), and an electric potential of the upper electrode 22 is lower than an electric potential of the lower electrode 23 in the second X-axis piezoelectric element 20(X2). Accordingly, the first X-axis piezoelectric element 20(X1) expands (becomes longer) in the X-axis direction, and the second X-axis piezoelectric element 20(X2) contracts (becomes shorter) in the X-axis direction. Consequently, the friction member 40 is displaced/moved toward the X-axis positive direction (refer to a solid line shown in FIG. 10).

Figure 10:
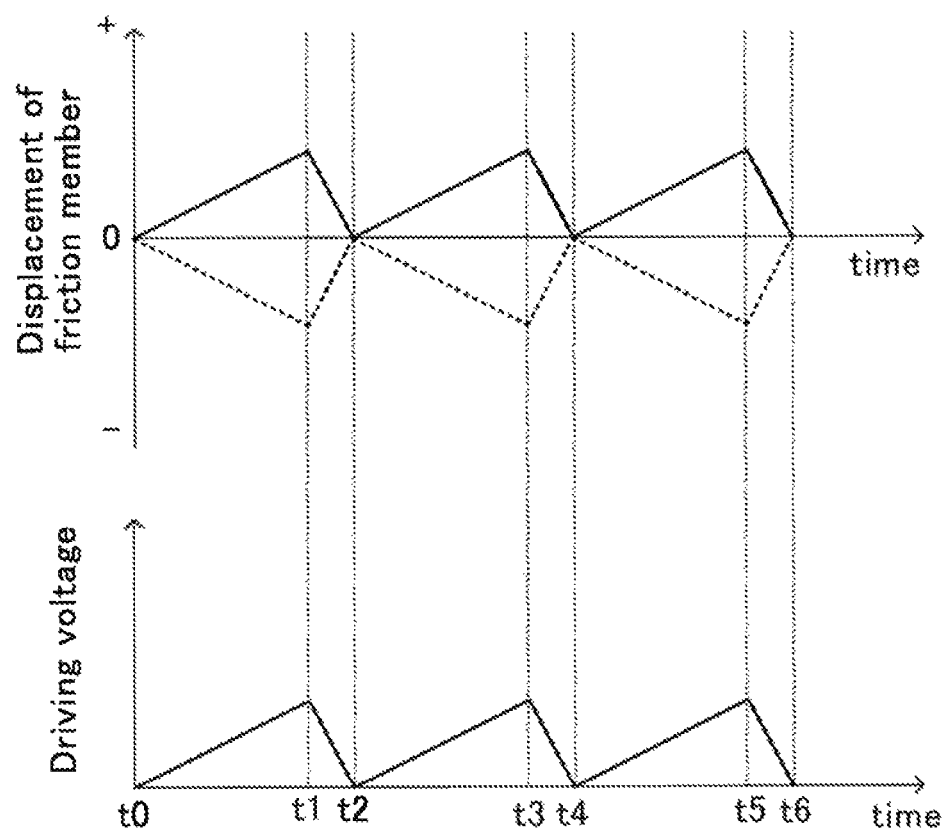
FIG. 10 is a timing chart showing a driving voltage applied to the piezoelectric actuator shown in FIG. 1, and a displacement of the friction member.

Meanwhile, as shown in FIG. 10, a driving voltage generated by the power supply VS gradually increases at first (refer to time t0-t1, t2-t3, and t4-t5) in each period, and then, rapidly decreases (refer to time t1-t2, t3-t4, and t5-t6).

For example, when the driving voltage is gradually increasing from time t0 to time t1, the first X-axis piezoelectric element 20(X1) slowly/moderately expands (becomes longer) in the X-axis direction, and the second X-axis piezoelectric element 20(X2) slowly/moderately contracts (becomes shorter) in the X-axis direction. Consequently, the friction member 40 slowly/moderately moves in the X-axis positive direction. Accordingly, the friction member 40 and the contact section 51 (movable body 50) do not move relatively to each other, and thus, "a static frictional force or a large force close to the static frictional force (first static frictional force)" is acted on between the friction member 40 and the contact section 51. As a result, the contact section 51 moves together with the friction member 40, and therefore, the movable body rotates around the Y-axis in a first rotation direction.

Thereafter, when the driving voltage rapidly decreases from time t1, the first X-axis piezoelectric element 20(X1) rapidly contracts (becomes shorter) in the X-axis direction, and the second X-axis piezoelectric element 20(X2) rapidly expands (becomes longer) in the X-axis direction. Consequently, the friction member rapidly moves in the X-axis negative direction. Accordingly, the contact section 51 (movable body 50) slides on the upper surface of the friction member 40, and therefore, a small kinetic friction force (second frictional force smaller than the first frictional force) is acted on between the contact section 51 and the friction member 40. Accordingly, the contact section 51 remains (stays) at the position when the driving voltage starts to rapidly decrease (i.e., time point t1). Thereafter, these actions are repeated, and thus, the movable body 50 is rotated around the Y-axis in the first rotation direction by a desired angle.

In contrast, when the switching element S2 and the switching element S3 are simultaneously closed, the switching element S1 and the switching element S4 are simultaneously opened. At this moment, if a positive electric potential is generated at the positive electrode (+) of the power supply VS, an electric potential of the upper electrode 22 is lower than an electric potential of the upper electrode 23 in the first X-axis piezoelectric element 20(X1), and an electric potential of the upper electrode 22 is higher than an electric potential of the lower electrode 23 in the second X-axis piezoelectric element 20(X2). Accordingly, the first X-axis piezoelectric element 20(X1) contracts (becomes shorter) in the X-axis direction, and the second X-axis piezoelectric element 20(X2) expands (becomes longer) in the X-axis direction. Consequently, the friction member 40 is displaced/moved toward the X-axis negative direction (refer to a broken line shown in FIG. 10). The displacement of the friction member 40 varies as shown by a broken line in FIG. 10, owing to the driving voltage. Accordingly, the movable body 50 is rotated around the Y-axis in a "second rotation direction opposite to the first rotation direction" by a desired angle.

It should be noted that, when the driving voltage is firstly rapidly increased, and thereafter, is gradually decreased, the movable body 50 can be rotated in a rotation direction opposite to the rotation direction of the movable body 50 when the driving voltage is firstly gradually increased, and thereafter, is rapidly decreased.

It should be noted that the movable body 50 can be rotated around the X-axis according to the followings. A circuit is prepared in which the first X-axis piezoelectric element 20(X1) and the second X-axis piezoelectric element 20(X2) shown in FIG. 9 are replaced with (by) the first Y-axis piezoelectric element 20(Y1) and the second Y-axis piezoelectric element 20(Y2), respectively. A driving voltage similar to one which is described above is applied to the first Y-axis piezoelectric element 20(Y1) and the second Y-axis piezoelectric element 20(Y2) in a time period in which the driving voltage is not being applied to the first X-axis piezoelectric element 20(X1) and the second X-axis piezoelectric element 20(X2).

Accordingly, the lower electrode 23 may be common to (shared by) all (four) of the plate-like piezoelectric elements (X1, X2, Y1, and Y2).

Second Embodiment

Next will be described a piezoelectric actuator 110 according to a second embodiment of the present invention with reference to FIGS. 11 and 12. In the piezoelectric actuator 10 according to the aforementioned first embodiment, the plate-like piezoelectric element 20 is a member separable (different) from the sheet 30, and the plate-like piezoelectric elements 20 are fixed onto the sheet 30. In contrast, in the piezoelectric actuator 110 according to the second embodiment, the sheet 30 is replaced with (by) a "sheet made of a piezoelectric body (hereinafter, referred to as a "piezoelectric sheet") 120". Accordingly, the piezoelectric body 120 has the same shape as the sheet 30.

Figure 11:
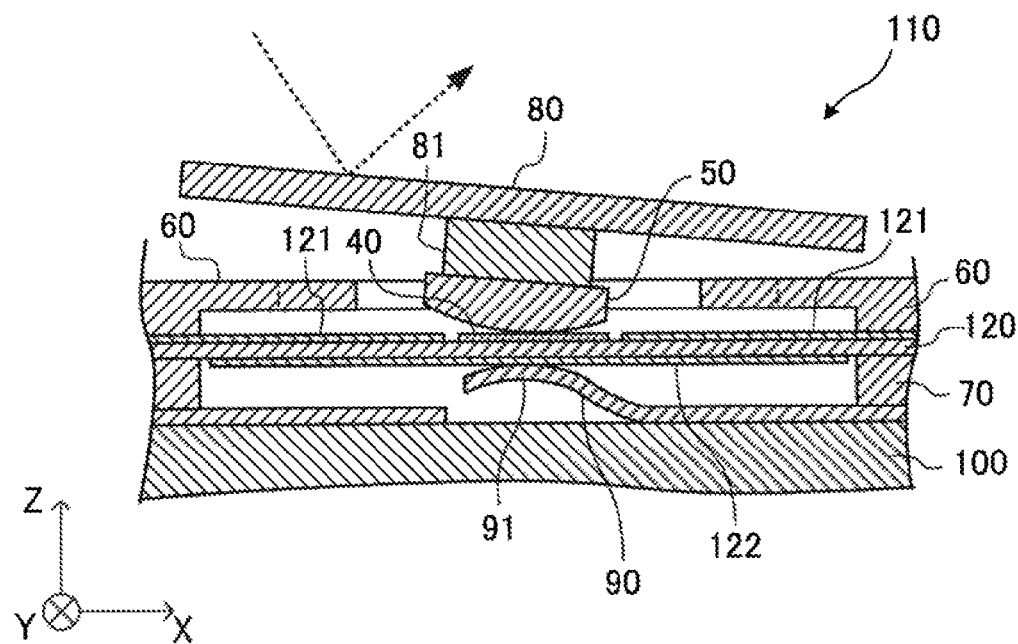
FIG. 11 is a schematic sectional view of a piezoelectric actuator according to a second embodiment of the present invention.
Figure 12:
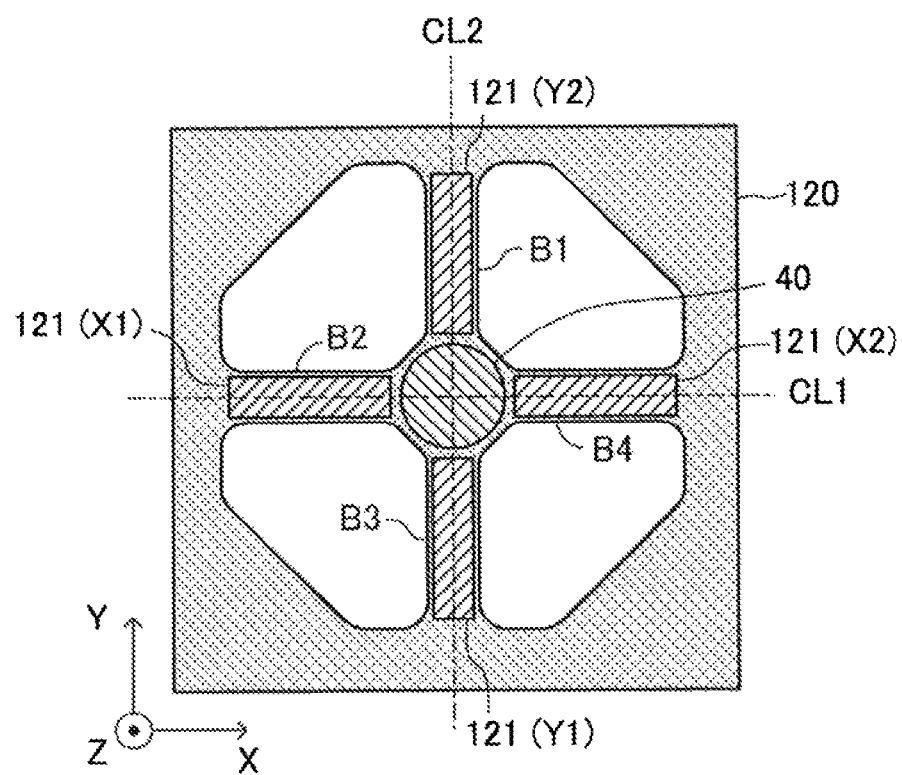
FIG. 12 is a plan view of the piezoelectric sheet, the upper electrodes, and the friction member, shown in FIG. 11.

Further, as shown in FIGS. 11 and 12, "upper electrodes (upper electrode layers) 121 and a lower electrode (lower electrode layer) 122" are formed at "portions (regions) of the piezoelectric sheet 120, the portions corresponding to the portions at which the plate-like piezoelectric elements 20 are formed in the piezoelectric actuator 10". As a result, the portions sandwiched between the upper electrodes 121 and the lower electrode 122 are formed at certain regions of the piezoelectric sheet 120, and those portions function as the plate-like piezoelectric elements. In this case, as understood form FIG. 11, upper surfaces of the plate-like piezoelectric elements are upper surfaces of the upper electrodes 121, and thus, the upper surfaces of the plate-like piezoelectric elements and the upper surface of the piezoelectric sheet 120 are parallel to each other. Lower surfaces of the plate-like piezoelectric elements are the lower surface of the lower electrode 122, and thus, the lower surfaces of the plate-like piezoelectric elements are parallel to each of the upper surface and the lower surface of the piezoelectric sheet 120. It should be noted that the friction member 40 is provided on the upper surface of the piezoelectric sheet 120 and at the center of the piezoelectric sheet 120, similarly to the sheet 30.

In the piezoelectric actuator 110, a driving voltage similar to one used in the first embodiment is applied between the upper electrodes 121 and the lower electrode 122 to expand/contract the portions sandwiched between the upper electrodes 121 and the lower electrode 122, so that the position of the friction member 40 is changed.

According to the piezoelectric actuator 110, the sheet and the plate-like piezoelectric elements are unified/integrated, it is therefore possible to reduce the number of parts and to simplify a manufacturing process. Consequently, more inexpensive piezoelectric actuator can be provided.

As described above, each of the piezoelectric actuators according to the embodiments of the present invention moves the movable body utilizing the expansion/contraction deformation in the direction parallel to the principal surface (upper surface) of the plate-like piezoelectric elements, and thus, it is unnecessary to increase the height of the piezoelectric element. Consequently, a smaller (downsized) piezoelectric actuator can be provided.

The present invention is not limited to the aforementioned embodiments, and various modifications may be made within the scope of the present invention, as follows.

The movable body 50 is one which rotates, however, it may be one that moves (translates) in the X-Y plane. Alternatively, the movable body may be one that can be moved in the X-axis direction only.

Each of the lower electrodes 23, 122 is the electrode layer common to (shared by) a plurality of the piezoelectric elements, however, an individual lower electrode can be provided to each of the piezoelectric elements. In such a case, the lower electrode is formed at a position opposed to the upper electrode.

The piezoelectric actuator may include at least one plate-like piezoelectric element.

For example, the piezoelectric actuator 10 may include the first X-axis piezoelectric element 20(X1) only among four of the plate-like piezoelectric elements shown in FIG. 4.

For example, the piezoelectric actuator 10 may include "the first X-axis piezoelectric element 20(X1) and the second X-axis piezoelectric element 20(X2) only" among four of the plate-like piezoelectric elements shown in FIG. 4.

For example, the piezoelectric actuator 10 may include "the first X-axis piezoelectric element 20(X1) and the first Y-axis piezoelectric element 20(Y1) only" among four of the plate-like piezoelectric elements shown in FIG. 4.

The plate-like piezoelectric elements 20 and the friction member 40 may be formed on surfaces of the sheet 30 different from each other. That is, the friction member 40 may be formed on the upper surface of the sheet 30, and the plate-like piezoelectric elements 20 may be fixed onto the lower surface of the sheet 30. In contrast, the plate-like piezoelectric elements 20 may be formed on the upper surface of the sheet 30, and the friction member 40 may be fixed onto the lower surface of the sheet 30.

Further, the spring element 90 may be formed of an elastic member (e.g., coil spring) having a different shape. The spring element 90 may be omitted, when an appropriate frictional force can be generated between the friction member 40 and the contact section 51 without the spring element 90.

As described above, in the piezoelectric actuators according to the embodiments of the present invention, the plate-like piezoelectric element (20) is provided to the sheet (30) in such a manner that the upper surface of the plate-like piezoelectric element is parallel to the upper surface of the sheet (30);

the sheet (30) includes the movable body driving section (40) on one of the upper surface and the lower surface of the sheet; and the movable body (50) includes the contact section (51) which contacts with the sheet (30) at the movable body driving section (40).

Further, each of the piezoelectric actuators according to the embodiments of the present invention is configured so as to move the movable body driving section (40) in the direction parallel to the upper surface of the sheet (30) by the expansion and contraction deformation in the direction parallel to the upper surface of the plate-like piezoelectric element (20) to thereby move the movable body (50) through the frictional force generated between the movable body driving section (40) and the contact section (51).

Further, each of the piezoelectric actuators according to the embodiments of the present invention includes the "spring element (90) which applies the force toward the movable body driving section (40)" to the portion on the opposite surface of the surface of the sheet 30 on which the movable body driving section (40) is formed, the portion being opposed to the movable body driving section (40).

Further, at least two of the plate-like piezoelectric elements (20) are disposed in such a manner that the center lines of the plate-like piezoelectric elements (20), each of the center lines being parallel to the longitudinal direction of each of the plate-like piezoelectric elements, intersect one another at the movable body driving section (40) when viewed along the direction perpendicular to the upper surface of the sheet (30).

In addition, the at least two of the plate-like piezoelectric elements (20), when viewed along the direction perpendicular to the upper surface of the sheet (30) (that is, in a planar view of the plate-like piezoelectric elements (20) and the sheet (30)), are disposed/arranged in such a manner that the center lines (axes) intersect one another at the contact point between the movable body driving section (40) and the contact section (51). Further, it can be said that the at least two of the plate-like piezoelectric elements (20) is disposed/arranged so as to be rotationally symmetric with respect to the contact point between the movable body driving section (40) and the contact section (51) in the planar view of the plate-like piezoelectric elements (20) and the sheet (30).

The invention claimed is:

1. A piezoelectric actuator comprising:
   a plate-like piezoelectric element having an upper surface and a lower surface parallel to said upper surface of said element;
   a sheet having an upper surface and a lower surface parallel to said upper surface of said sheet; and
   a movable body,
   wherein,
   said plate-like piezoelectric element is provided to said sheet in such a manner that said upper surface of said plate-like piezoelectric element is parallel to said upper surface of said sheet;
   said sheet includes a movable body driving section formed on one of said upper surface of said sheet and said lower surface of said sheet;
   said movable body includes a contact section which contacts with said sheet at said movable body driving section; and
   said piezoelectric actuator is configured so as to move the movable body driving section in a direction parallel to said upper surface of said sheet by using expansion and contraction deformation of said plate-like piezoelectric element in a direction parallel to said upper surface of said plate-like piezoelectric element to thereby move said movable body through frictional force generated between said movable body driving section and said contact section.

2. The piezoelectric actuator according to claim 1, further comprising a spring element applying a force toward said movable body driving section onto a portion of the other surface of said sheet on which said movable body driving section is not formed, said portion being opposed to said movable body driving section.

3. The piezoelectric actuator according to claim 1, wherein said plate-like piezoelectric element has a belt-like shape having a longitudinal direction and a width direction, said width direction being orthogonal to said longitudinal direction when viewed along a direction perpendicular to said upper surface of said plate-like piezoelectric element, and
   said piezoelectric actuator further including at least two of said plate-like piezoelectric elements, wherein center lines of said two of said plate-like piezoelectric elements each parallel to said longitudinal direction are on the same straight line and said two of said plate-like piezoelectric elements are arranged to be opposed to each other and sandwich said movable body driving section therebetween when viewed along a direction perpendicular to said upper surface of said sheet.

4. The piezoelectric actuator according to claim 1, wherein said plate-like piezoelectric element has a belt-like shape having a longitudinal direction and a width direction, said width direction being orthogonal to said longitudinal direction when viewed along a direction perpendicular to said upper surface of said plate-like piezoelectric element, and
   said piezoelectric actuator further including at least two of said plate-like piezoelectric elements, wherein center lines of said two of said plate-like piezoelectric elements each parallel to said longitudinal direction intersect one another at said movable body driving section when viewed along a direction perpendicular to said upper surface of said sheet.

5. The piezoelectric actuator according to claim 4, wherein said at least two of said plate-like piezoelectric elements are arranged so as to be rotationally symmetric with respect to a contact point between said movable body driving section and said contact section when viewed along said direction perpendicular to said upper surface of said sheet.

6. The piezoelectric actuator according to claim 5 further including four of said plate-like piezoelectric elements, wherein said four of said plate-like piezoelectric elements are arranged so as to form a cross-line figure when viewed along said direction perpendicular to said upper surface of said sheet.

7. The piezoelectric actuator according to claim 1, wherein said plate-like piezoelectric element is fixed on one of said upper surface of said sheet and said lower surface of said sheet.

8. The piezoelectric actuator according to claim 1, wherein, said sheet is a piezoelectric sheet; and
   said plate-like piezoelectric element is formed by a portion of said piezoelectric sheet, said portion being sandwiched by a pair of electrodes.

9. A piezoelectric actuator array comprising a plurality of said piezoelectric actuators, each according to claim 1, wherein, a plurality of said piezoelectric actuators are arranged in a lattice pattern.

* * * * *